United States Patent

Bernot et al.

[11] Patent Number: 6,058,780
[45] Date of Patent: May 9, 2000

[54] CAPACITIVE PRESSURE SENSOR HOUSING HAVING A CERAMIC BASE

[75] Inventors: Anthony J. Bernot, Gilbert; Grenville Hughes, Tucson; Laura J. Lindberg, Tempe, all of Ariz.

[73] Assignee: AlliedSignal Inc., Morristown, N.J.

[21] Appl. No.: 08/986,253

[22] Filed: Dec. 5, 1997

Related U.S. Application Data

[60] Provisional application No. 60/040,824, Mar. 20, 1997.

[51] Int. Cl.⁷ ........................................................ G01L 9/12
[52] U.S. Cl. ............................................ 73/724; 361/283.4
[58] Field of Search ................... 73/718, 724; 361/283.4

[56] References Cited

U.S. PATENT DOCUMENTS

| | | |
|---|---|---|
| 3,232,114 | 2/1966 | Ferran . |
| 3,697,835 | 10/1972 | Satori . |
| 3,962,921 | 6/1976 | Lips . |
| 3,965,746 | 6/1976 | Rabek . |
| 4,101,952 | 7/1978 | Burn . |
| 4,184,189 | 1/1980 | Davis et al. . |
| 4,221,047 | 9/1980 | Narken et al. . |
| 4,396,721 | 8/1983 | Lawless . |
| 4,405,970 | 9/1983 | Swindal et al. . |
| 4,422,335 | 12/1983 | Ohnesorge et al. . |
| 4,426,673 | 1/1984 | Bell et al. . |
| 4,609,966 | 9/1986 | Kuisma . |
| 4,689,999 | 9/1987 | Shkedi . |
| 4,831,492 | 5/1989 | Kuisma . |
| 4,876,892 | 10/1989 | Arabia et al. . |
| 4,926,696 | 5/1990 | Haritonidis et al. . |
| 4,998,179 | 3/1991 | Grantham et al. . |
| 5,005,421 | 4/1991 | Hegner et al. . |
| 5,049,421 | 9/1991 | Kosh ....................................... 428/34.4 |
| 5,050,035 | 9/1991 | Hegner et al. . |
| 5,189,591 | 2/1993 | Bernot . |
| 5,211,058 | 5/1993 | Fukiura et al. . |
| 5,317,919 | 6/1994 | Awtrey . |
| 5,349,492 | 9/1994 | Kimura et al. . |
| 5,440,931 | 8/1995 | Wiegand et al. . |
| 5,446,616 | 8/1995 | Warren . |
| 5,485,345 | 1/1996 | Lukasiewicz et al. . |
| 5,486,976 | 1/1996 | Charboneau et al. . |
| 5,499,158 | 3/1996 | Bishop et al. . |
| 5,525,280 | 6/1996 | Shukla et al. . |
| 5,528,452 | 6/1996 | Ko . |
| 5,544,399 | 8/1996 | Bishop et al. . |
| 5,578,528 | 11/1996 | Wuu et al. . |
| 5,585,311 | 12/1996 | Ko . |
| 5,740,594 | 4/1998 | Lukasiewicz et al. . |
| 5,776,276 | 7/1998 | Goebel et al. . |
| 5,801,313 | 9/1998 | Horibata et al. . |

FOREIGN PATENT DOCUMENTS

| | | |
|---|---|---|
| 0 473 109 | 3/1992 | European Pat. Off. . |
| 0 473 109 A3 | 3/1992 | European Pat. Off. . |

OTHER PUBLICATIONS

Patent Abstracts of Japan Publication No. 01284726, Publication Date Nov. 16, 1989 Applicant Toyota Autom Loom Works Ltd., Inventor Shimazaki Kazunori.

Patent Abstracts of Japan Publication No. 01284727, Publication Date Nov. 16, 1989 Applicant Toyota Autom Loom Works Ltd., Inventor Miwa Makoto.

"A Glass–Based Capacitive Transducer", Apr. 1996.

*Primary Examiner*—Joseph L. Felber
*Attorney, Agent, or Firm*—Robert Desmond, Esq.

[57] ABSTRACT

A capacitive pressure sensor capsule has a housing with a ceramic cover sealingly attached to a ceramic base that defines an interior chamber. The sensing medium enters the chamber through an inlet port. A glass sensor is attached to an integral pillar that extends from the housing into the chamber. A conducting member extends through the pillar into the housing and carries the signals from the sensor. The combination of the glass sensor and ceramic housing provides high accuracy over a wide range of temperature, because the thermal coefficient of expansion of glass and ceramic are similar. Hermetic sealing of the sensor electrical circuitry ensures long term immunity from the sensed environment.

30 Claims, 2 Drawing Sheets

CAPACITIVE PRESSURE SENSOR HOUSING HAVING A CERAMIC BASE

REFERENCE TO COPENDING APPLICATION

This application claims the benefit of U.S. Provisional Application Ser. No. 60/040,824 filed Mar. 20, 1997.

TECHNICAL FIELD

This invention relates generally to pressure sensors or transducers and in particular to glass sensors.

BACKGROUND OF THE INVENTION

Ohnesorge et al, U.S. Pat. No. 4,422,335 discloses a pressure transducer made using quartz plates and Bernot, U.S. Pat. No. 5,189,591 discloses a pressure transducer using glass plates. Whether glass or quartz, these sensors have generally been mounted to headers made of aluminum or stainless steel. Besides being expensive to machine, another disadvantage to these aluminum and stainless steel headers is that it is difficult to hermetically seal the electrical connections to these sensors. Without a hermetic seal liquid and gas contaminants in the sensing medium can enter and ruin the sensor. As a result these types of sensors can only be used where the pressure medium is contaminant free such as dry gasses.

Accordingly, a need exists for a more robust capacitance sensor where the electrical connections can be hermetically sealed.

SUMMARY OF THE INVENTION

In view of the above, it is an object for this invention to provide a more robust glass sensor that can be used is sensing mediums containing liquid or gas contaminants.

The present invention achieves these objects by providing a capacitive pressure sensor capsule that includes a housing with a ceramic cover sealingly attached to a ceramic base to define an interior chamber. The sensing medium enters the chamber through an inlet port. A glass sensor is attached to the end of a tube member that extends from the housing into the chamber. Conducting pins or film extend through the hole in the ceramic header carry the signals from the sensor.

These and other objects, features and advantages of the present invention are specifically set forth in or will become apparent from the following detailed description of a preferred embodiment of the invention when read in conjunction with the accompanying drawings.

DESCRIPTION OF THE INVENTION

Bernot, U.S. Pat. No. 5,189,591 which issued on Feb. 23, 1993 and is assigned to AlliedSignal Inc. is hereby incorporated by reference. This patent discloses a capacitive pressure transducer made of aluminosilicate glass.

Figure 1:
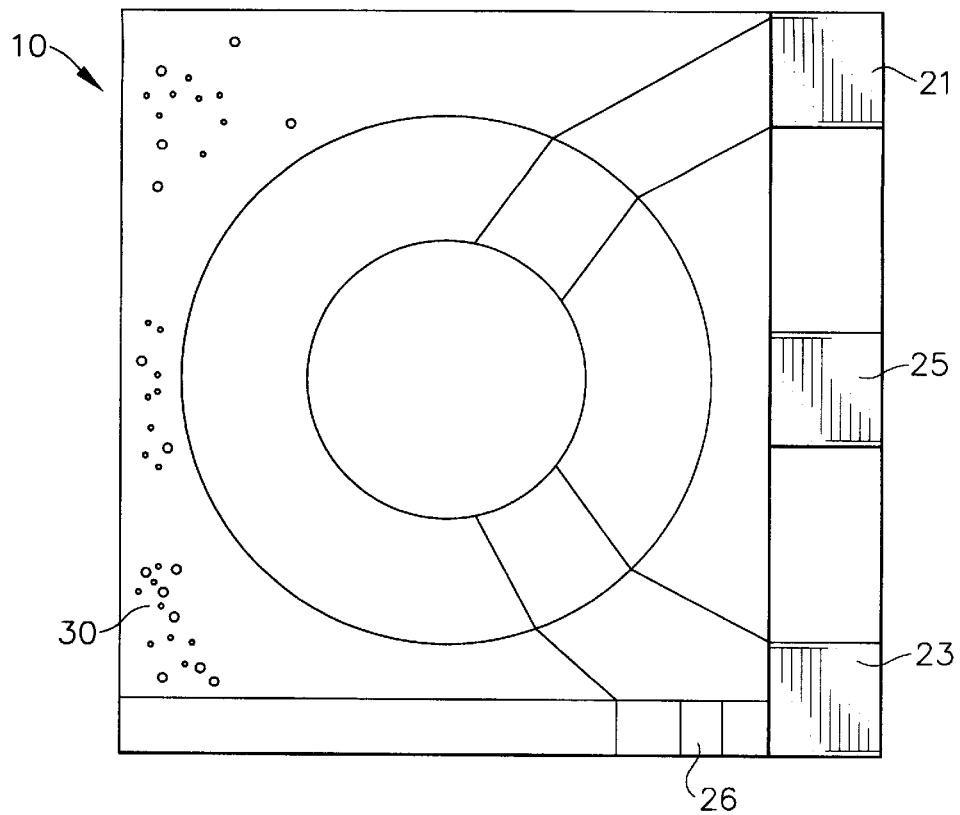
FIG. 1 is a top view of a glass pressure transducer.
Figure 2:
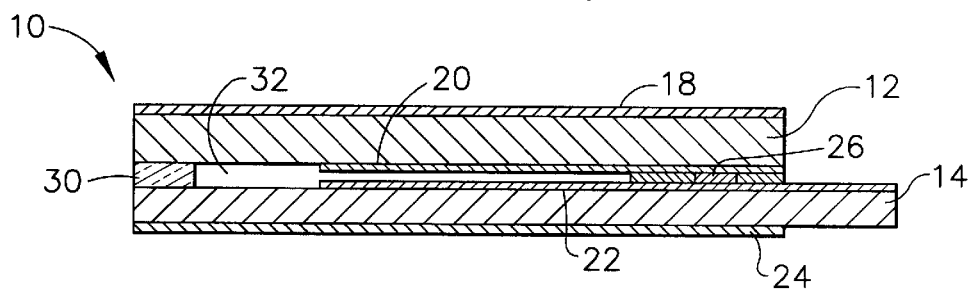
FIG. 2 is a side view of the pressure transducer of FIG. 1.

A glass pressure transducer 10 contemplated by the present invention is shown in FIGS. 1 and 2. The transducer or sensor 10 includes a top diaphragm 12 and a bottom diaphragm 14 which may be of different thicknesses made from a glass preferably aluminosilicate glass such as the aluminosilicate glasses sold under the trademark CORNING #1723 or CORNING #1737F. Ground shields 18 and 24 are deposited on the outer surfaces of the diaphragms 12 and 14. Electrodes 20 and 22 are deposited in the inner surfaces of the diaphragms 12 and 14. A crossover metal tab 26 preferably made of silver acts as a conductor from the electrode 20 to a top electrode lead 21. Alternatively, the crossover tab 26 can be made from other metals such as platinum, palladium, or gold. The electrode 22 is connected to a bottom electrode lead 23. A ground lead 25 may also be added. The leads 21, 23, and 25 are preferably made of a noble metal, preferably platinum. Wires, not shown, may be connected to these leads. The geometry of the electrodes 20, and 22 can be round, square, or other shape. In addition the electrodes can be configured as multiple reference capacitor or pressure capacitors. The ground shields 18, 24 and the electrodes 20, 22 are made of a noble metal preferably platinum.

The diaphragms 12 and 14 are bonded together such that the electrodes 20 and 22 form a capacitor. The bond is formed by hydrate bonding, glass friting, or other adhesives. The frit glass 30 acts as a spacer between the diaphragms 12 and 14 and also as a seal to form a cavity 32 between the diaphragms. The cavity 32 can be evacuated to form either a vacuum, some other reference pressure, or left open for gauge pressure measurement.

Figure 3:
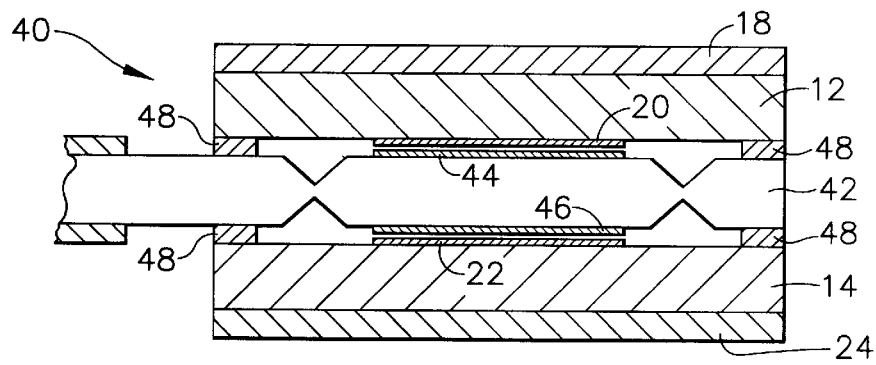
FIG. 3 is a side view of a glass accelerometer.

Referring to FIG. 3, a three piece glass accelerometer 40 can be formed from the pressure transducer 10 by mounting a glass, preferably aluminum silicate, seismic mass 42 between the top and bottom diaphragms 12,14. The seismic mass 42 has an electrode 44 in opposed relationship with electrode 20 and an electrode 46 in opposed relationship with electrode 22. The seismic mass 42 is bonded to the diaphragms 12,14 by frit 48 in such a way as to form cavity 49.

Figure 4:
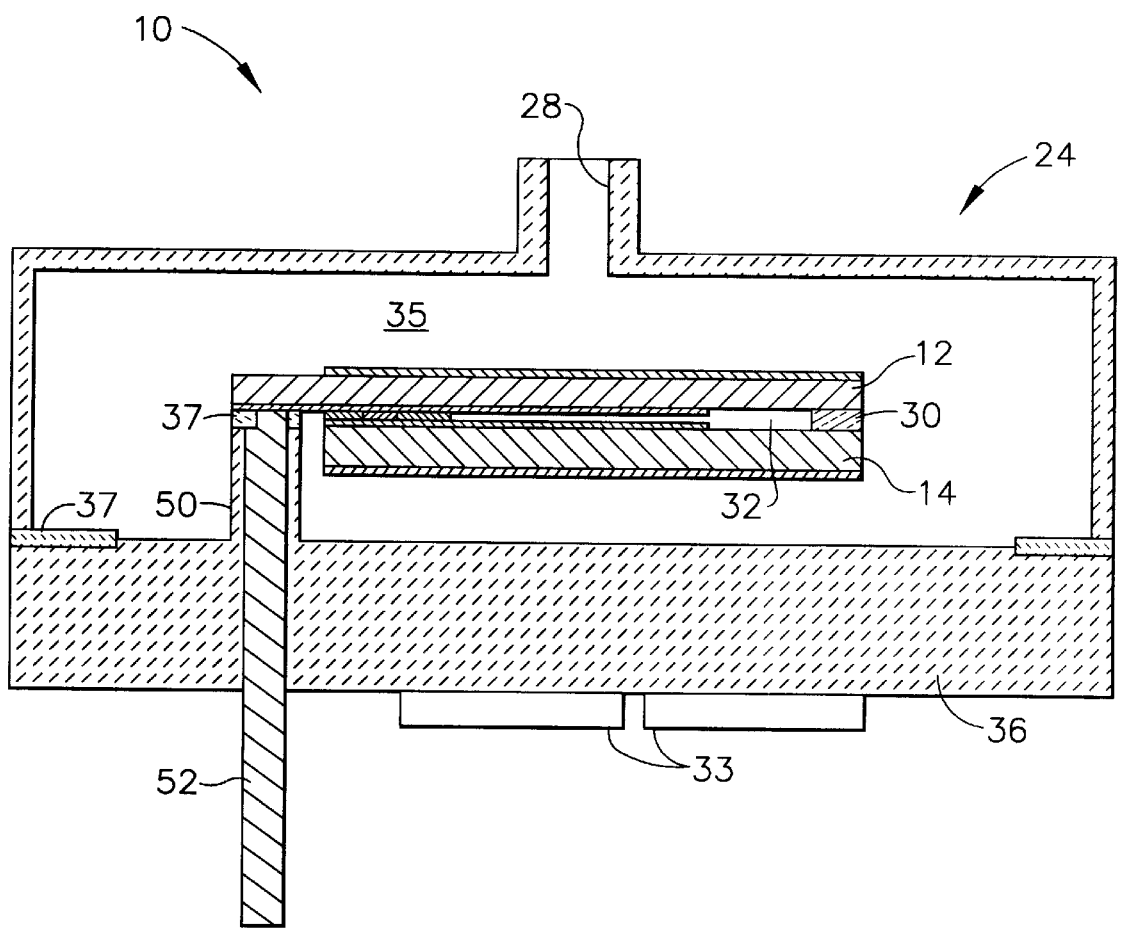
FIG. 4 is a schematic of the sensor of FIG. 1 mounted in a ceramic housing as contemplated by the present invention.

Referring to FIG. 4, the sensor 10 is mounted within a two part glass ceramic housing having a cover 24 and a header or base 36 that define an interior chamber 35. The cover 24 and header 36 can be made by aqueous ceramic injection molding or a dry process similar to that currently used to make spark plugs. Alternatively, the cover 24 can be made of metal or polymer. The cover 24 and base 36 can be sealed together with glass or ceramic frit 37 or organic adhesive or using a mechanical sealing method. The cover 24 has a pressure inlet port 28 that is in fluid communication with a source of fluid pressure to be measured and with the chamber 35. In a manner familiar to those skilled in the art, the base 36 is mounted to electronic circuitry 33. The base 36 has at least one holes through the integral pillar 50 which extends into the chamber 35. The top diaphragm 12 is mounted to the end of the pillar 50 with glass or ceramic frit 37 or other adhesive. At least two metal conducting pins 52 or films, electrically connect top diaphragm 12 through the pillar 50 to optional electronic circuitry on the base 36. The cover 24 and base 36 can have a variety of shapes such as square, rectangular or circular.

The combination of the glass diaphragms and ceramic housing provides high accuracy over a wide range of temperature, because the thermal coefficient of expansion of glass and ceramic are matched. Hermetic sealing of the sensor electrical circuitry ensures long term compatibility with the sensed environment. Capsule mounting techniques minimizes mechanically induced stresses and hysteresis thus maximizing sensor performance. Thus the sensor is made more robust than those in the prior art and can be used with sensing mediums that contain gas or liquid contaminants.

What is claimed is:

1. A capacitive pressure sensor capsule comprising:
   a housing having a ceramic cover sealingly attached to a ceramic base to define an interior chamber, said housing further including an inlet port in fluid communication with a source of fluid pressure to be measured and said chamber, and further having a pillar member extending into said chamber;
   a glass sensor attached to said pillar member and disposed in said chamber; and
   at least one conducting member extending from said sensor and through said pillar member and into said housing.

2. The capsule of claim 1 wherein said cover and base are sealed together with an adhesive.

3. The capsule of claim 2 wherein said adhesive is glass frit.

4. The capsule of claim 1 wherein said glass sensor comprises:
   a first diaphragm with a first electrode thereon;
   a second diaphragm with a second electrode thereon; and
   said first and second diaphragms bonded together so that said first and second electrodes cooperate to form a capacitor.

5. The capsule of claim 4 wherein said diaphragms are of different thicknesses.

6. The capsule of claim 4 wherein said diaphragms are bonded together with frit, said first diaphragm spaced from said second diaphragm to define a cavity therebetween.

7. The capsule of claim 6 wherein said cavity is evacuated to a preselected pressure.

8. The capsule of claim 6 wherein said cavity is open to ambient.

9. The capsule of claim 4 further comprising a crossover tab connecting said first electrode to a lead.

10. The capsule of claim 4 further comprising a ground shield on each of said diaphragms.

11. A capacitive pressure sensor capsule comprising:
    a housing having a metal cover sealingly attached to a ceramic base to define an interior chamber, said housing further including an inlet port in fluid communication with a source of fluid pressure to be measured and said chamber, and further having a pillar member extending into said chamber;
    a glass sensor attached to said pillar member and disposed in said chamber; and
    at least one conducting member extending from said sensor and through said pillar member and into said housing.

12. The capsule of claim 11 wherein said cover and base are sealed together with an adhesive.

13. The capsule of claim 12 wherein said adhesive is glass frit.

14. The capsule of claim 11 wherein said glass sensor comprises:
    a first diaphragm with a first electrode thereon;
    a second diaphragm with a second electrode thereon; and
    said first and second diaphragms bonded together so that said first and second electrodes cooperate to form a capacitor.

15. The capsule of claim 14 wherein said diaphragms are of different thicknesses.

16. The capsule of claim 15 wherein said diaphragms are bonded together with a glass frit, said first diaphragm spaced from said second diaphragm to define a cavity therebetween.

17. The capsule of claim 16 wherein said cavity is evacuated to a preselected pressure.

18. The capsule of claim 16 wherein said cavity is open to ambient.

19. The capsule of claim 14 further comprising a crossover tab connecting said first electrode to a lead.

20. The capsule of claim 14 further comprising a ground shield on each of said diaphragms.

21. A capacitive pressure sensor capsule comprising:
    a housing having a polymer cover sealingly attached to a ceramic base to define an interior chamber, said housing further including an inlet port in fluid communication with a source of fluid pressure to be measured and said chamber, and further having a pillar member extending into said chamber;
    a glass sensor attached to said pillar member and disposed in said chamber; and
    at least one conducting member extending from said sensor and through said pillar member and into said housing.

22. The capsule of claim 21 wherein said cover and base are sealed together with an adhesive.

23. The capsule of claim 22 wherein said adhesive is a glass frit.

24. The capsule of claim 21 wherein said glass sensor comprises:
    a first diaphragm with a first electrode thereon;
    a second diaphragm with a second electrode thereon; and
    said first and second diaphragms bonded together so that said first and second electrodes cooperate to form a capacitor.

25. The capsule of claim 24 wherein said diaphragms are of different thicknesses.

26. The capsule of claim 25 wherein said diaphragms are bonded together with a glass frit, said first diaphragm spaced from said second diaphragm to define a cavity therebetween.

27. The capsule of claim 26 wherein said cavity is evacuated to a preselected pressure.

28. The capsule of claim 26 wherein said cavity is open to ambient.

29. The capsule of claim 24 further comprising a crossover tab connecting said first electrode to a lead.

30. The capsule of claim 24 further comprising a ground shield on each of said diaphragms.

* * * * *